July 20, 1926.
C. A. GREENLEAF
1,592,846
BLOCK OR TIP FOR BRAKE OR CLUTCH BANDS
Filed May 3, 1924
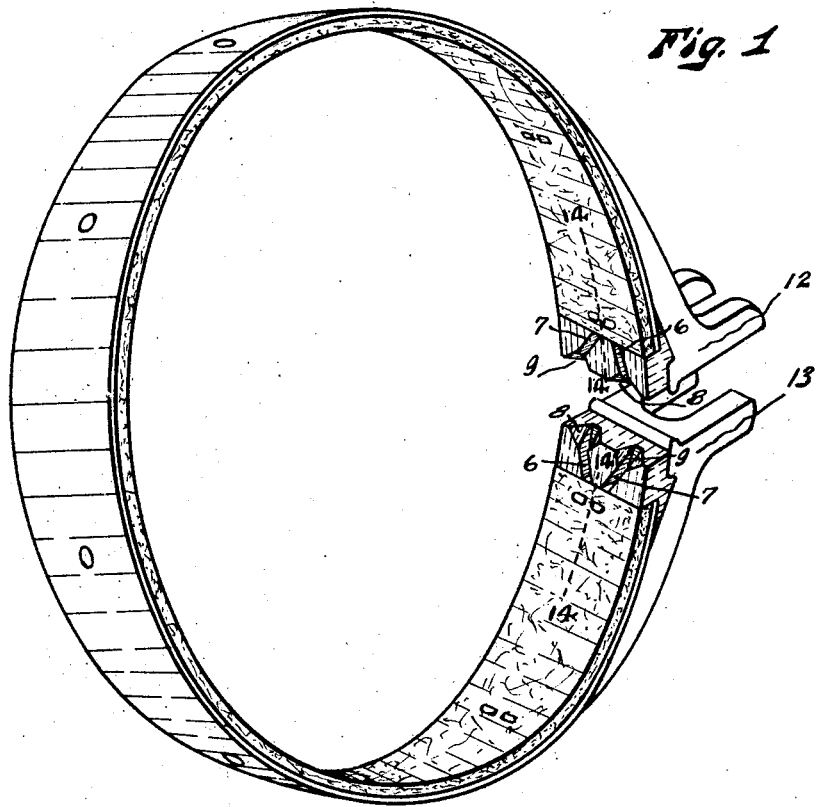
Fig. 1
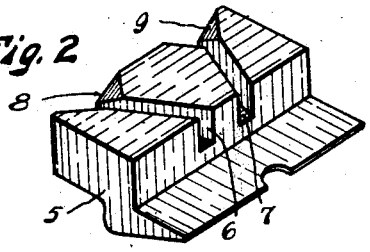
Fig. 2
Fig. 4
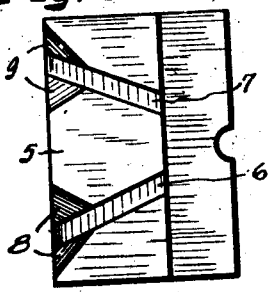
Fig. 3
INVENTOR
Clement A. Greenleaf
BY
ATTORNEY Patented July 20, 1926.

1,592,846

UNITED STATES PATENT OFFICE.

CLEMENT A. GREENLEAF, OF EVERETT, WASHINGTON.

BLOCK OR TIP FOR BRAKE OR CLUTCH BANDS.

Application filed May 3, 1924. Serial No. 710,731.

My invention relates to the block or tip for a brake or clutch band. More particularly, my invention pertains to providing a block or tip for a transmission band with oil grooves which are so disposed as not to weaken the block and at the same time permit of the admission of such a quantity of oil to the inner friction surface of the band that the same is continuously washed and lubricated.

My invention will be described for purposes of definiteness and clearness as applying and pertaining particularly to the split brake or clutch transmission band of the type and style as used on a Ford motor car. It is to be understood, however, that my invention is not to be limited to any such definite application, but is co-extensive to all situations where like conditions and problems prevail, such as occur in hoisting apparatus as well as in mechanism in connection with vehicles.

Brake bands for said motor vehicles are provided with clamping brackets near the ends of said band, said brackets having radially disposed ears by means of which the ends of said split band may be caused to approach each other in exerting their braking or clamping effort. The inside of this band is equipped with a strip of friction material. This band is ordinarily mounted with the said brackets disposed uppermost, which means that the weight of the entire band rests on those portions of the band embraced by said clamping brackets. One end portion of said split band is fixedly disposed while the other is movable. Experience has taught that in bringing the ends of the brake band together there is a tendency to cause those portions of the band embraced by said clamping brackets to grip securely the brake drum without the rest of the brake band functioning in the said braking effort. It is, therefore, highly desirable that said end portions of the brake band should be held apart from the brake drum, so that the clamping effort may be transmitted to the remainder of the brake band, and cause it to exert its gripping effort practically throughout its entire length. To this end, blocks or tips, as they are commonly called in the trade, have been provided for the end portions of the band, so that such a brake or transmission band will exert its gripping effort practically throughout its entire length, and one which will make contact in the middle portion in the first instance, and then, as the braking effort continues, the contact will extend both ways from the middle towards said end portions. This in part eliminates the highly objectionable gripping and chattering effect so often observed in brake or transmission bands as at present designed. However, it does not entirely eliminate the tendency to chattering. Frequently, lining material with use becomes glazed, and as soon as this glazing appears, the band will chatter. The friction lining material is relatively thin, and as the said blocks or tips above referred to are likewise relatively thin, it is difficult to provide oil grooves therein without materially weakening said blocks. However, these oil grooves should be such as to provide a complete washing of the friction lining, so that a large quantity of oil should be admitted. A primary object of my invention is to provide oil grooves of such character and so disposed that they will operate in conjunction with the operation of the band to provide the necessary quantity of oil to perform the washing operation and at the same time not interfere objectionably with the strength of said bands.

The above mentioned general objects of my invention, together with others inherent in the same, are attained by the device illustrated in the following drawings, the same being merely preferred exemplary forms of embodiment of my invention, throughout which drawings like reference numerals indicate like parts:

Figure 1 is a view in perspective of a transmission band having blocks or tips embodying my invention;

Fig. 2 is a view in perspective of a block or tip embodying my invention;

Fig. 3 is a top view of said block; and

Fig. 4 is a view of a block with a modified form of oil groove.

Blocks 5, preferably formed of fiber or material having a low coefficient of friction, are provided with oil grooves 6 and 7, which are flaringly disposed as respects the longitudinal axis of the band toward the end portions of said band. The ends of said grooves 6 and 7, adjacent the end portions of the band, are preferably provided with funnel end portions 8 and 9. The modified form of block or tip 10, shown in Fig. 4, is provided with a single oil groove 11. These blocks may be of any form and may be secured to the band in any operative manner. For purposes of illustration, I have chosen as my preferred form of block, shown in Figs. 1, 2 and 3, the block embodying my invention for which a separate application has been heretofore filed, bearing Serial Number 647,741.

The mode of operation of a device embodying my invention is as follows:

The clamping of the transmission band in the gripping operation and the releasing of the same produces a suction or pump action, as respects the surrounding oil. In releasing the band embodying my invention, the end portions, at which are disposed the brackets 12 and 13, are first to move apart from the drum, and thus the block with its funnel-like openings 8 and 9 is positioned to receive the oil in considerable quantities, and it is fed to the brake band towards the center indicated by the dotted line 14, 14. If the grooves are disposed straight across the block or tip instead of in an inclined direction, the oil is not properly supplied to the center designated by the line 14, 14. Providing blocks of the type herein illustrated, with the grooves 6 and 7 sloping towards the center line 14, 14, or flaringly disposed as respects the end of the band, provides for such an ample quantity of the oil, together with the forced suction already described, that the band throughout practically its entire length is washed with oil in such quantities that the particles of carbon, dirt and foreign matter, which are to be found in the crank case, are washed out of the interstices of the brake lining, thereby preventing the glazing of the lining, and thereby eliminating the chattering of the band.

From actual experience it has been found that the life of the lining has been increased two to three times that of the lining where said blocks have not been provided with said oil grooves. Moreover, the providing of the grooves in the manner as herein set forth provides for the necessary quantity of oil, and it does so without so weakening the block as to cause it to break. It will be understood that said block is subjected to considerable pressure and wearing. Thus, the pressure surface is preferably not greatly reduced. As the blocks wear thin, there would be danger of the same breaking, and if they break and fall down into the oil, they may cause considerable damage to the transmission mechanism. The inclining of the walls of the oil grooves to the center is positively fundamental to my invention, and I make no claim to an oil groove not having such inclination, that is, to grooves whose walls are straight across the block.

In the modified form of my invention shown in Fig. 4, the great width of the oil groove permits the same to be shallow; therefore, it does not interfere with the strength of the block. But I have found from actual experience that the inclining of two grooves, as set forth in the preferred form, operates successfully, and permits the blocks to scrape the oil, as it were, from the revolving drum and thereby provides an ample supply of oil to the grooves to thoroughly wash and lubricate the friction lining.

Obviously, changes may be made in the forms, dimensions and arrangement of the parts of my invention, without departing from the principle thereof, the above setting forth only preferred forms of embodiment.

I claim:—

1. A brake or clutch device embodying a split band; clamping brackets secured on the end portions thereof; a strip of lining friction material operatively attached to said band; and blocks or tips operatively disposed on said band at said end portions, said blocks having one or more oil grooves whose walls are flaringly disposed towards the end portion.

2. A brake or clutch device embodying a split band; clamping brackets secured on the end portions thereof; a strip of lining friction material operatively attached to said band; and blocks or tips operatively disposed on said band at said end portions, said blocks having one or more oil grooves inclined from the lateral edges of said band to the center thereof, said grooves being provided with funnel openings on the side of said block adjacent the end, whereby oil is directed to the center of said strip of friction lining.

3. A brake or clutch device embodying a split band; clamping brackets secured on the end portions thereof, having transverse grooves cut therein; a strip of lining friction material operatively attached to said band; and blocks of material relatively less compressible than said friction strip, said blocks having a rib integrally formed thereon, said rib being disposed to fit into said bracket grooves, and said blocks being engaged and releasably held in position by the end portion of said band, whereby the friction strip is caused to exert its gripping action throughout practically its entire length, and said blocks having one or more oil grooves inclined from the lateral edges of said band toward the center thereof.

4. In combination with a device of the character described, a block of hard fiber, abrasion and heat-resisting and of low coefficient of friction, having a rib disposed along one bottom edge thereof, said rib projecting beyond the lateral portion of said block, said block having one or more oil grooves inclined from the lateral edges of said band toward the center thereof.

5. In combination with a brake or clutch device embodying a split band, a block operatively disposed on the end portions of said band, said block having one or more oil grooves inclined from the lateral edges of said band toward the center thereof.

In witness whereof, I hereunto subscribe my name this 25th day of April, A. D. 1924.

CLEMENT A. GREENLEAF.